Figure 1:
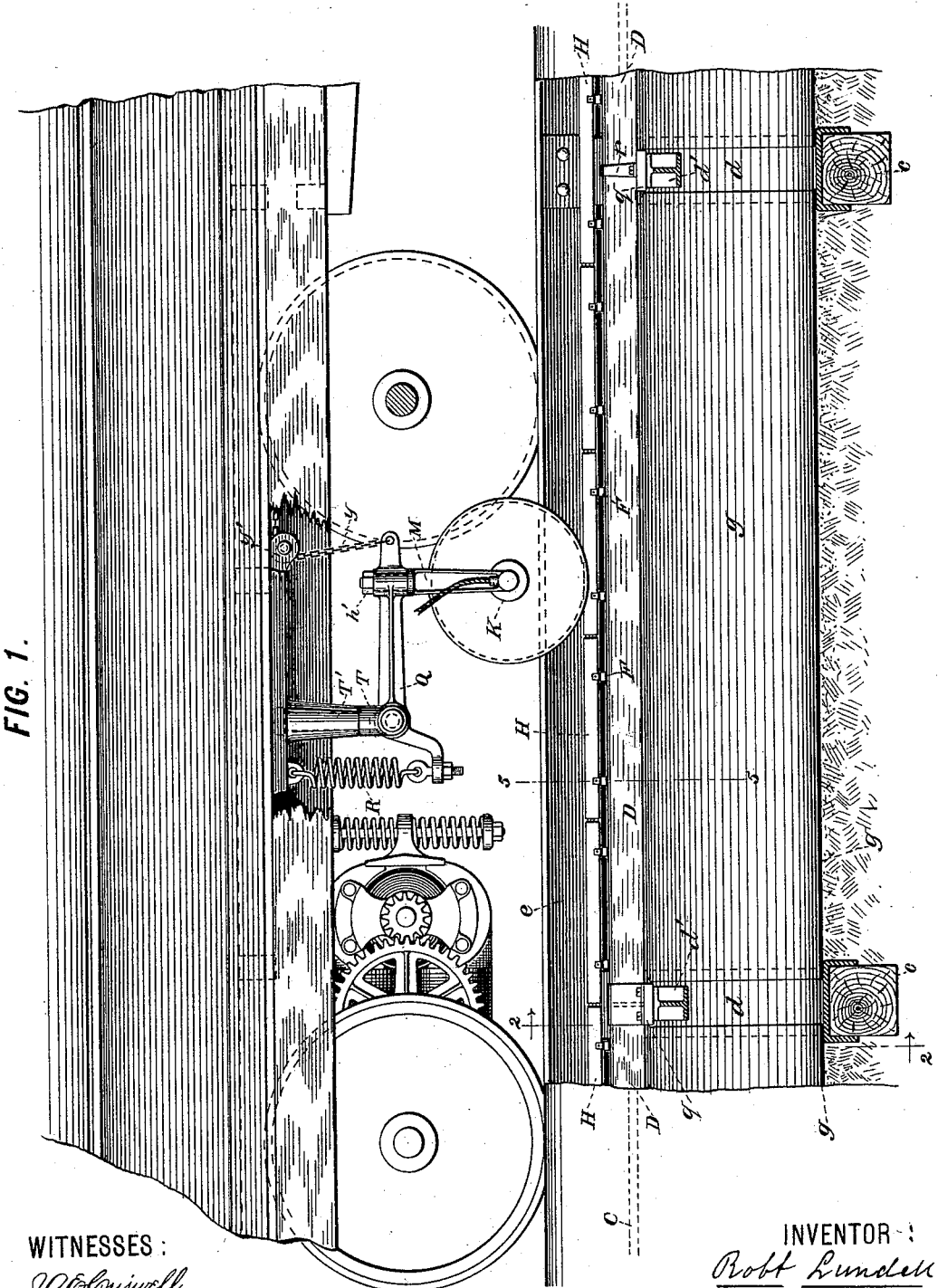

(No Model.) 6 Sheets—Sheet 1.

R. LUNDELL.
ELECTRIC RAILWAY.

No. 400,926. Patented Apr. 9, 1889.

WITNESSES:
J.A.C.Criswell
C. K. Fraser.

INVENTOR:
Robt Lundell
BY
Arthur C. Fraser & Co
ATTORNEYS.

(No Model.) 6 Sheets—Sheet 2.
R. LUNDELL.
ELECTRIC RAILWAY.
No. 400,926. Patented Apr. 9, 1889.
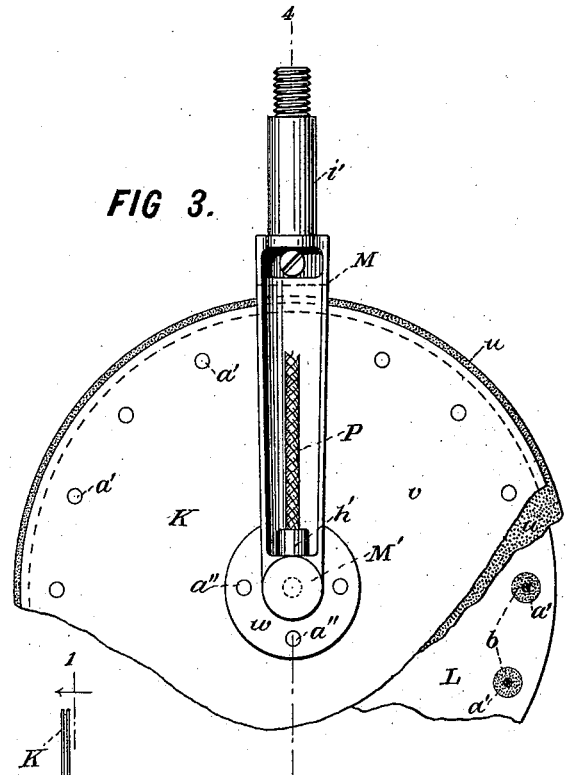
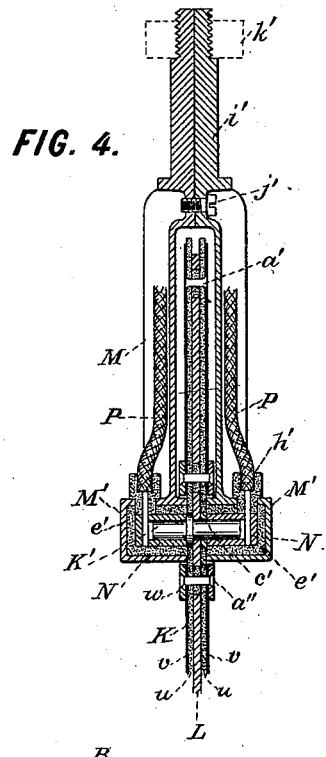
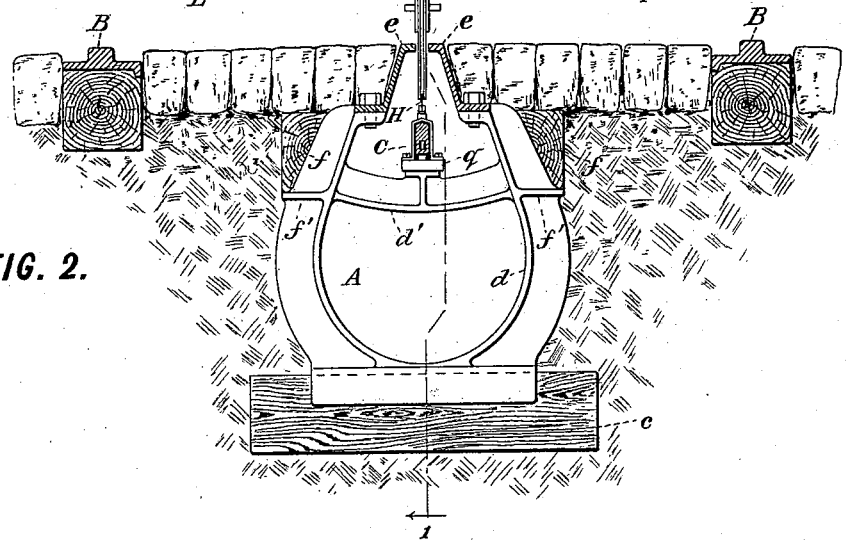
WITNESSES:
J. A. Caswell
C. K. Fraser
INVENTOR:
Robt Lundell
BY
Arthur G. Fraser & Co.
ATTORNEYS.

(No Model.) 6 Sheets—Sheet 3.
R. LUNDELL.
ELECTRIC RAILWAY.
No. 400,926. Patented Apr. 9, 1889.
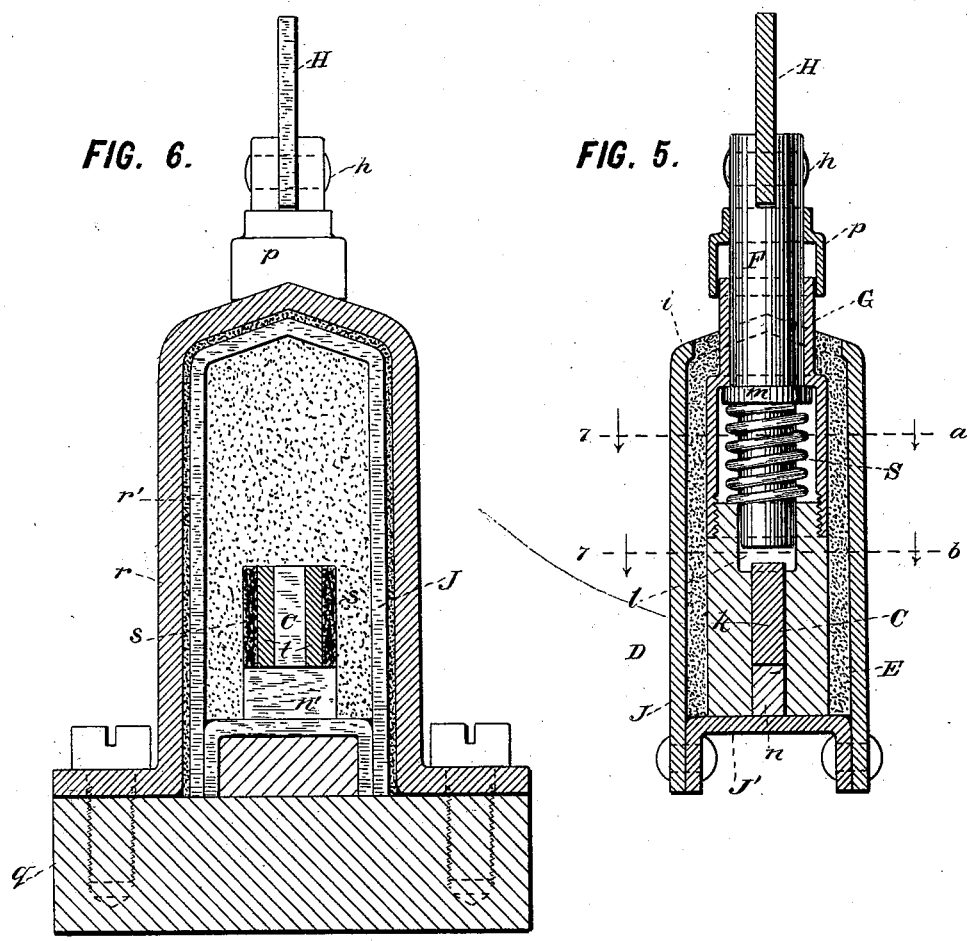
WITNESSES:
James J. Wood,
Burton H. Cook
INVENTOR:
Robt. Lundell
BY
Arthur C. Fraser & Co.
ATTORNEYS.

(No Model.)  6 Sheets—Sheet 4.

R. LUNDELL.
ELECTRIC RAILWAY.

No. 400,926.  Patented Apr. 9, 1889.

WITNESSES:

INVENTOR:
Robt Lundell
BY
Arthur E. Fraser & Co
ATTORNEYS.

(No Model.) 6 Sheets—Sheet 5.
R. LUNDELL.
ELECTRIC RAILWAY.
No. 400,926. Patented Apr. 9, 1889.
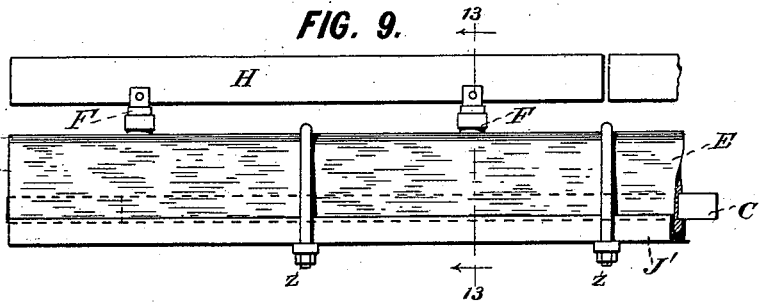
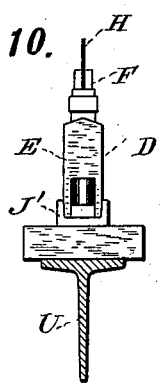
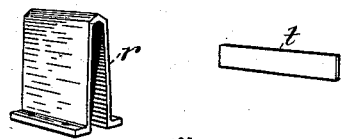
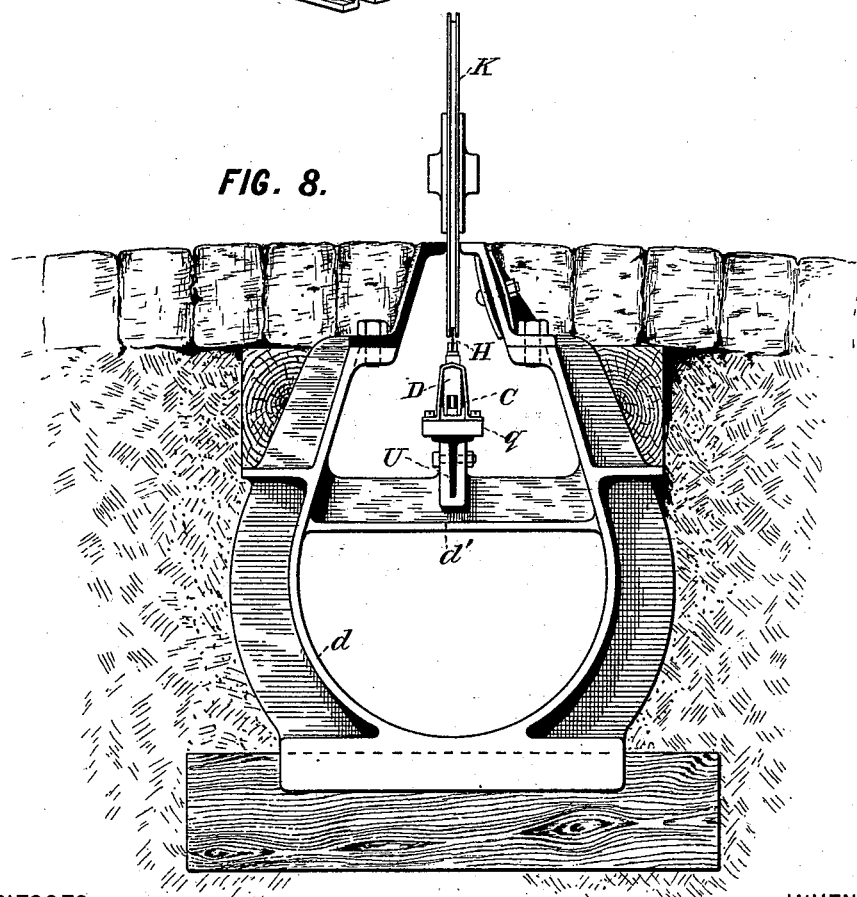
WITNESSES:
James J. Wood
Burton H. Cook
INVENTOR:
Robt. Lundell
BY
Arthur E. Fraser
ATTORNEYS.

(No Model.) 6 Sheets—Sheet 6.

R. LUNDELL.
ELECTRIC RAILWAY.

No. 400,926. Patented Apr. 9, 1889.

WITNESSES:
James J. Wood
Burton H. Cook

INVENTOR:
Robt. Lundell
BY
Arthur C. Fraser
ATTORNEYS.

UNITED STATES PATENT OFFICE.

ROBERT LUNDELL, OF NEW YORK, N. Y.

ELECTRIC RAILWAY.

SPECIFICATION forming part of Letters Patent No. 400,926, dated April 9, 1889.

Application filed December 12, 1888. Serial No. 293,405. (No model.)

*To all whom it may concern:*

Be it known that I, ROBERT LUNDELL, residing in the city, county, and State of New York, have invented certain new and useful Improvements in Electric Railways, of which the following is a specification.

This invention relates to electric railways of that class wherein the electric current is conducted to the car through two sets of conductors, a thoroughly insulated line-conductor, and a sectional service-conductor, the sections of which are brought into electric connection with the line-conductor successively during the advance of the car, so that the section with which the collector or conducting terminal of the circuit on the car is in contact is alone in electrical connection with the line-conductor, all the other sections of the service-conductor being out of circuit, so that leakage is reduced to the one section that is in circuit. Several different constructions have been heretofore proposed for carrying this system into practice. According to one method the service-conductor is made of sections of considerable length and mechanically fastened together at their ends, but electrically insulated and mounted at intervals upon elastic supports, so that upon the passage of a car the service-conductor, being somewhat elastic, is deflected by the downward pressure of a wheel or runner carried by the car, thereby compressing the elastic support and bringing together two contacts inclosed therein, the one connected to the farthest conductor and the other connected by a branch to the insulated line-conductor. According to another method a conducting section or runner is carried by the car and passes over successive short service conductors or contacts arranged so close together that the runner encounters a new one before passing beyond the preceding one. The connection in the contact-boxes has according to this system been made in two ways. In the first way the downward pressure of the runner depresses the short service conductor or contact and closes together two contacts in its supporting-box, as in the construction first described. In the other way the circuit-closing contacts in the successive boxes or supports are made of magnetic material and are caused to mutually attract each other when magnetized by induction from a magnet carried by the car. According to a third method for carrying the general system first mentioned into practice the service-conductor consists of a succession of short vertical plungers or plates arranged in a series along and just over the line-conductor, normally held out of contact therewith by being supported by elastic cushions, and pressed down into contact therewith against the resistance of these cushions by the pressure of a wheel or runner carried by the moving car.

My invention aims to improve upon the means heretofore proposed for carrying into practice the general system of conductors first referred to.

My invention has particular reference to the application of electric conductors to conduits formed beneath the pavement of a street, and with which communication is made through an open slot in the upper side of the conduit, after the manner of cable railways. To this end it provides an improved construction of electric conductors adapted to be laid in such a conduit, and also an improved construction and mounting for the collecting-wheel carried by the car for taking off the current from conductors laid in such a conduit. According to my invention I inclose the line-conductor on all sides in a continuous sheath of insulating material, provide it with a suitable longitudinal support to relieve both the conductor and its sheath of the strain of supporting the downward pressure which will be brought to bear upon them, and arrange these parts longitudinally within a conduit of the character described beneath and parallel with the open slot thereof and support them at intervals therein on suitable cross-pieces or other supporting devices. At suitable intervals the upper side of the line-conductor is bared by the removal of the insulation above it, in order to admit the insertion of a vertical plunger, for which a suitable guiding socket or support is provided. The plunger is placed in this support along with a spring to press it up, and its upper end passes out of the support, as through a stuffing-box.

The service-conductor consists of a succession of narrow bars or plates arranged directly over the insulating casing or sheath of the line-conductor, with their ends slightly out of contact and supported by being mounted on the projecting upper ends of the successive plungers, each section being supported upon two plungers engaging it near its opposite ends. Upon the pressing down of any section one or other, or both, of its supporting-plungers is pressed down, thereby bringing the lower end thereof into contact with the exposed upper surface of the line-conductor.

The collector on the moving car consists of a wheel built up of a disk of conducting material embraced between two disks of insulating material, outside of which, in order to protect them from wear, are placed disks of steel or other durable material. The outer disks are of larger diameter than the middle disks, in order to form flanges for the wheel to cause it to roll upon the sectional service-conductor. The wheel is mounted in rotative bearings in a fork or bearing-frame, which in turn is swiveled in the end of a lever which is pivoted to some part of the car and receives the tension of a spring which communicates a downward pressure to the wheel in excess of the upward pressure of the springs, which press up the plungers on which the sections of the service-conductor are mounted, so that by the preponderating pressure of this spring the wheel is caused to press down the sections.

Figure 15:
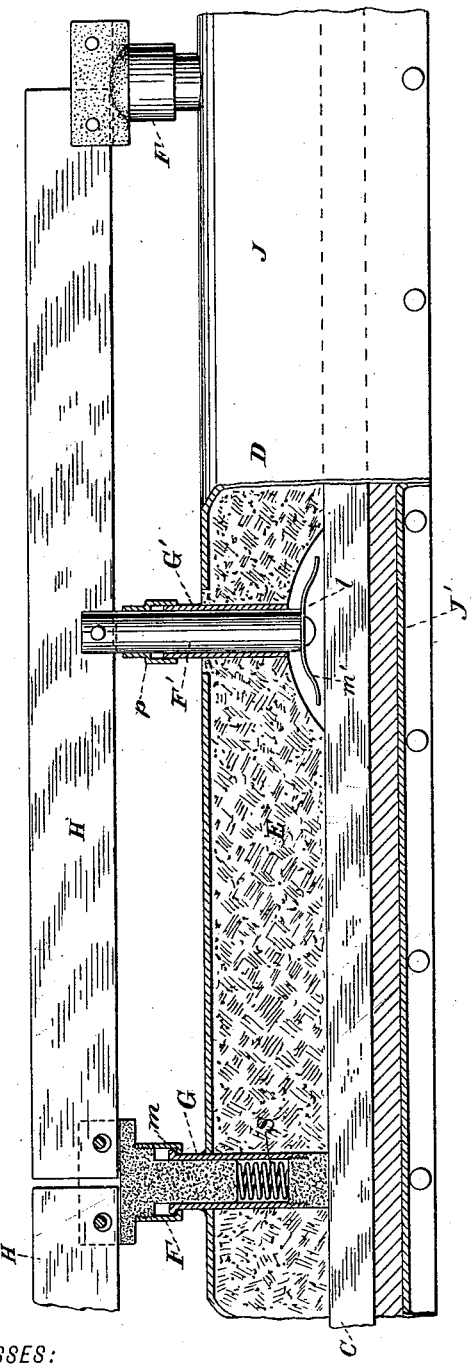
Figure 7:
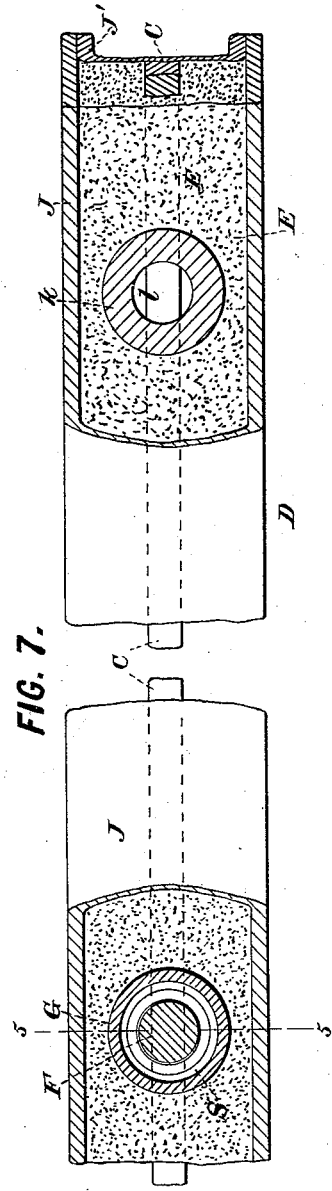
Figure 12:
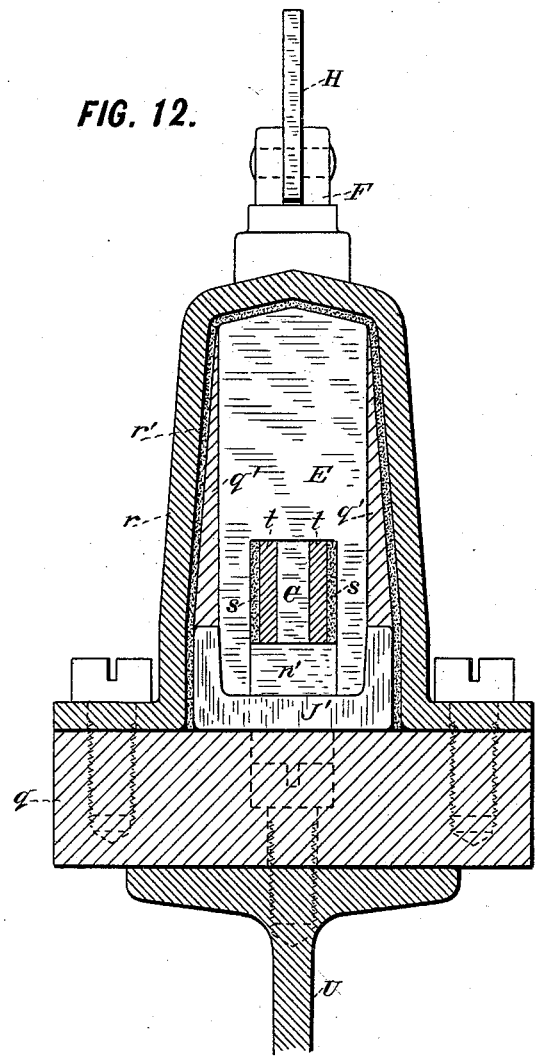
Figure 13:
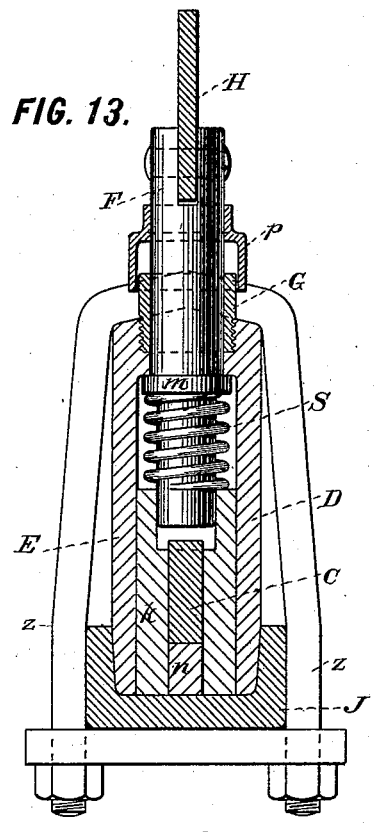
Figure 14:
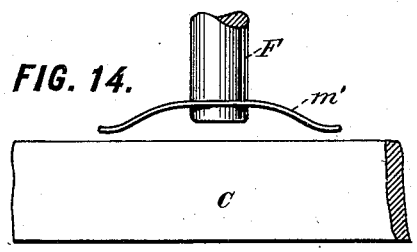

Figures 1 to 7, inclusive, of the accompanying drawings show the preferred form of my invention. The remaining figures illustrate a modification. Fig. 1 is a longitudinal mid-section through the conduit, cut in the plane of the line 1 1 in Fig. 2 and including a side elevation of a portion of the car partly broken away. Fig. 2 is a transverse section through the conduit in the plane of the line 2 2 in Fig. 1, and showing the collector-wheel in elevation. Fig. 3 is a fragmentary side elevation on a larger scale of the collector-wheel and its bearing-fork removed from the carrying-lever. Fig. 4 is a vertical transverse mid-section on the line 4 4 in Fig. 3. Fig. 5 is a transverse vertical section through the conductors and elastic circuit-closing support or contact-plunger on a larger scale, the section being in the plane of the line 5 5 in Figs. 1 and 7. Fig. 6 is a transverse section through the conductors in the joint between two successive lengths thereof. Fig. 7 is a plan of the line-conductor and its supporting-casing on a smaller scale than Figs. 5 and 6, the left-hand portion being in horizontal section in the plane of the line $7^a$ and the right-hand portion on the line $7^b$ in Fig. 5. Of the remaining views, illustrating a modified construction, Fig. 8 is a transverse section answering to Fig. 2. Fig. 9 is a side elevation of the conductors and insulating and supporting casing on a larger scale. Fig. 10 is an end elevation thereof in section through one of the joints, and showing the supporting T-beam in section. Fig. 11 is a perspective view of the fastening hood or strap for joining the ends of the successive lengths of the main conductor-casing. Fig. 12 is a vertical transverse section on a larger scale through the joint, (view answering to Fig. 6.) Fig. 13 is a vertical transverse section through one of the circuit-closing plungers (answering to Fig. 5.) Fig. 14 is a side elevation of the main conductor on the lower end of the plunger, showing a further modification. Fig. 15 is a side elevation, partly in vertical longitudinal mid-section, illustrating a modification of the method of supporting the sectional service-conductor and of establishing electrical connection between it and the line-conductor.

The open-slot conduit A is or may be constructed in the same manner as similar conduits for cable railways. In the construction shown cross-ties $c\ c$ are laid at intervals, and on them are placed rigid cast frames $d\ d$, having flanges at their upper ends, to which are bolted wrought iron or steel slot-rails $e\ e$, the upper flanges of which approach each other closely enough to leave a continuous space or "slot" between them. Stringer-beams $f f$ are arranged on opposite sides of the conduit between the successive frames $d\ d$, with their ends resting on flanges $f'$ thereof and serving to support the pavement above them. Lengths of sheet-iron, $g$, are inserted between the frames $d\ d$, being curved to form the inner wall of the conduit, and their upper edges being fastened to the stringers $f f$ on opposite sides. A good construction is thus provided, which, however, may be varied greatly according to circumstances. The conduit is preferably laid between the two track-rails B B, as usual.

The line-conductor consists of a copper or other metallic bar, C, of the cross-section shown in Fig. 5. A bar of suitable length—say, for example, thirty feet—is inclosed in an insulating and supporting casing, D, preferably of the same length, so as to form a complete section, so that the successive sections can be laid end to end in much the same manner as railway-rails are laid. In the preferred construction this casing D consists of an exterior metallic shell for imparting strength and an insulating filling or sheath, E, within it and inclosing the line-conductor C on all sides. Any construction, however, by which the line-conductor shall be thoroughly surrounded and insulated, and which is adapted to impart sufficient strength or rigidity to the casing, may be substituted.

The casing D is provided at intervals with vertical plungers F F, the arrangement of which is best shown in Fig. 1, while their construction is shown in detail in Fig. 5. The casing D is provided with a vertical guiding-shell, G, through which the plunger works. The lower end of the plunger is arranged a short distance above the upper surface of the conductor C, and the latter is exposed at this point, so that when the plunger is pressed down it shall come into electrical contact with the conductor, and shall be constituted thereby a branch conductor for conveying the electric current thence upward to the service-conductor H, to one of the sections of which the protruding upper end of the plunger is connected. The plunger is normally pressed upward by the spring S and makes contact with the line-conductor only when forced down by pressure communicated to it through the service-conductor H. The latter consists of a succession of sections or strips arranged edgewise, each section being supported on two plungers, F F, one near each end, as shown in Fig. 1. The connection between the section H and the plunger is made by sawing or milling a notch into the upper end of the plunger sufficiently wide to admit the thickness of the plate or strip H, inserting the latter therein, and passing a transverse pin, $h$, through the plunger and plate to form a pivotal connection, the ends of the pin being riveted down.

The casing D (shown in Figs. 5, 6, and 7) is constructed with an exterior metal stiffening-shell, J. It is made by bending up a plate of iron or other metal into U shape, holes having been previously formed in the plate at the points where the plungers are to project out, one of these holes being indicated at $i$ in Fig. 5. The plate having thus been bent up, the insulating-filling E is put into it, preferably by employing a plastic substance and casting it in the shell J while the latter is inverted. A deep groove is formed or left in the lower part of the filling for the reception of the conductor C; but before this conductor is inserted therein (and, if desired, before the groove is formed) the plungers are put in place. A vertical cylindrical bore concentric with the hole $i$ is made through the insulating-filling, either by casting the latter around a core or by boring out the hole subsequently, and in this bore the plunger-shell G and plunger F are inserted from the lower side. The shell G is expanded sufficiently in its lower part to admit a collar, $m$, formed on the plunger, and to provide a space below it for the spring S. A cylindrical plug of wood or other insulating material, $k$, is united to the shell G, preferably by screwing it thereto before its insertion in the bore, the spring S having been previously inserted, so that this spring reacts downwardly against the plug and upwardly against the collar $m$ to press up the plunger. The plug $k$ has a slot formed laterally through it, extending from its bottom end up nearly to the bottom end of the plunger, for the reception of the line-conductor C. Preferably this slot extends up into a chamber, $l$, formed in the upper part of the plug, in which the reduced lower end of the plunger works. The longitudinal slot or groove for receiving the conductor C may be formed after the insertion of the plungers by plowing a deep groove through the insulating filling and through the plugs $k$ $k$. The conductor C being inserted in this groove, a strip, $n$, of insulating material is inserted beneath it, in order to insulate its lower side. The open bottom of the U-shaped shell J is then closed by applying a piece of channel-iron, J', which is fastened to the shell J on both sides by rivets at intervals. The line-conductor is thus inclosed in a tubular shell of strong rigid metal, from which it is separated on all sides by a thick insulating-filling, the only portions of the conductor which are not thus surrounded by insulation being the portions within the chambers $l$ $l$ of the respective plunger-casings. The plunger-casings are strongly supported by being thoroughly embedded in the insulating-filling, the shell G of each plunger being insulated by said filling from the exterior tubular shell, J. To prevent the entrance of water into the interior of the plunger-casing, where it might cause a leakage between the exposed surface of the conductor C and the bottom end of the plunger, the plunger is provided with a thimble, $p$, which is slipped over its upper end and fastened to it by soldering or brazing, and the lower part of which thimble extends down beyond and embraces the upper end of the shell G. The service-conductor section H is subsequently connected to the plunger by the rivet $h$. The conductors C H and casing D being thus constructed, they are laid in the conduit, (before the latter is closed,) being supported at intervals therein in any suitable way, preferably by resting on cross-bars $d'$, cast integral with the frames $d$ $d$.

On the support is placed a block of wood, $q$, which is fastened down to the support, preferably by screwing it thereto, as shown in Fig. 12. The casing D is then laid on this block, and a strap, $r$, is passed over it and its ends are fastened down to the block to confine the casing thereto by the insertion of screws. To make the joint between the ends of two successive casings D D their ends are laid on the block $q$, with a slight space between them to allow for expansion, and a strap, $r$, sufficiently wide to overlap for a suitable distance upon the ends of both casings, is placed over them and fastened down to the block $q$ by screws, as shown in Fig. 6. Preferably this strap $r$ is insulated from the metallic shell J of the casing by the interposition of a sheet, $r'$, of insulating material.

In order to connect electrically together the lengths of copper bar forming the line-conductor C, the end portions of these bars in the respective sections are exposed on the sides for a short distance back from the end of the casing D by widening the groove in which they lie and placing against them on opposite sides plates $t$ $t$, Fig. 6, of conducting metal, which extend across the joint and embrace the ends of the conductors between them after the manner of fish-plates, being pressed tightly against the sides of the conducting-bars by cushions $s$ $s$, of rubber or other elastic material, inserted outside of them within the widened grooves. A block or filling-piece, n', is placed in the widened groove underneath the joint.

Referring now to Figs. 1, 3, and 4, K is the collector-wheel carried by the motor-car, and which is pushed or pulled along thereby through the open slot of the conduit. This wheel is made somewhat thinner than the width of the slot, so as to readily travel therein. It is built up of layers, as shown in Figs. 2 and 3, including a middle conducting layer or disk, L, of copper or other metal, two insulating-disks, u u, on opposite sides of it, and two outer steel disks, v v, for imparting strength to the wheel and taking the wear against the slot. The wheel is formed with peripheral flanges on opposite sides to cause it to ride upon the sectional service-conductors H H without slipping off sidewise. These flanges are preferably formed by making the insulating-disks u u of larger diameter than the conducting-disk L. The steel disks v v should be of somewhat smaller diameter than the insulating-disks. The whole structure is bound strongly together by means of rivets a', passed through from one steel disk to the other, the conducting-disk L being insulated from these rivets by being formed with large holes b', through which the rivets pass concentrically, and in which are placed washers of insulating material. Near the center of the wheel washers w w are placed on opposite sides and fastened together by rivets a'', insulated in like manner from the conducting-disk L. The wheel is mounted on a short shaft or arbor, K', Fig. 4, which has a collar formed on it, which comes against the upper disk, K, on one side thereof, while a loose car, t', is slipped over the arbor against the copper disk on the other side, so that by its being embraced between these collars a good electrical connection is made between the disk and arbor. The arbor turns with the wheel, its opposite projecting ends forming the journals therefor. They enter bearing sockets or cups N N, carried by the two halves of a forked bearing-frame, M, Fig. 4. The cups N N are held in sockets M', but are electrically insulated therefrom by an intervening insulating-filling, e'. The bared ends of conducting wires or cables P P are thrust through insulating-plugs h' into sockets in the respective cups N N, whereby an electrical connection is formed between these conducting-cables and the conducting-disk L of the collector-wheel K. The cables P P (of which essentially there need be only one) pass up through the channeled arms of the bearing-fork M and are conducted thence to the motor on the car in any approved way.

The forked bearing-frame M is made in halves, as shown in Fig. 4, in order to facilitate the insertion or removal of the wheel K. Above its bifurcated portion it is formed with a journal, i', half of which is formed on each half of the frame. The two halves are united by a screw, j', beneath this journal and a nut, k', above it. The bearing-frame M is swiveled to a lever, Q, which has a bearing-socket embracing the journal i'. The lever Q is pivoted on a horizontal axis, and a spring, R, is arranged to exert a tension against it in such direction as to press the wheel K downwardly with an effective pressure considerably in excess of the upward pressure of the plunger-springs S S. The swiveling of the frame M to the lever Q is for the purpose of allowing the wheel K to accommodate itself to curves in the slot, and for the same purpose the lever Q is connected to the car-body through a swiveled connection, being pivoted on a horizontal axis to a post, T, which is swiveled in a vertical standard, T', fixed to the car-body. For the purpose of lifting the wheel K out of the slot at will, a chain, y, is attached to the lever Q, is passed over a sheave, y', and conducted to any convenient part of the car, so that by pulling this chain the lever Q is lifted.

In operation the moving car carries the wheel K along with it, and the downward pressure applied to it by the spring R causes this wheel to depress successively the sections H H of the service-conductor, thereby bringing the sections successively into circuit with the line-conductor C C. As the wheel K rides from one section H onto another it first presses down only one end of the new section, its pressure upon this end exerting first an upward tension at the other end until it has passed the first plunger, whereupon its downward pressure is communicated to the other end of the section and causes that end also to become depressed, so that the entire section remains pressed down while the wheel is traveling between the two plungers; but when the wheel advances beyond the second plunger the first plunger rises, and when the wheel rides off onto the next section the second plunger also rises. Thus each section constitutes a lever having two fulcra, on which the lever rocks in succession. It is hence highly desirable that the sections H should be attached to the plungers in such way as to admit of some degree of lost motion—such, for example, as by horizontal pivots, as shown—although the extent of angular motion at these pivotal connections is so minute as to be almost imperceptible.

The modified construction of conductor-casing shown in Figs. 8 to 13 differs from that already described, chiefly in the absence of any exterior metal shell. The casing D consists of a continuous or extended section of insulating material, E, supported on a plate of channel-iron, J', to which it is fastened at intervals by clamps z z, consisting of U-shaped rods with their ends passed through holes in a yoke and having nuts screwed on them. The extended bar E of insulating material is bored out from underneath at intervals to form cavities through which the plungers F F may work, the lower part of the bore being filled by a plug, k, of insulating material, as before, after the insertion of the plunger and its spring S. Each bore is counterbored from the top, and into it is screwed a bushing, G', which projects up into the thimble $p$. The deep groove is plowed out along the under side of the insulating-bar and through the plugs $k\ k$ therein, and the line-conductor C is laid in this groove, the bottom of the groove being subsequently filled by the insertion of a strip, $n$, of insulating material, as before. The joint between two successive lengths of conductors is made in the same manner, as already described, by means of fish-plates $t\ t$, lapping over the end portions of the conductor-sections, and by an exterior hood or saddle, $r$, screwed down to the wooden block $q$. In addition to the sheet of insulation $r'$, tapering filling-pieces $q'$ are inserted. The wooden block $q$ is screwed down to a supporting T-beam, U, which extends longitudinally beneath the conductors and is supported on cross-bars $d'$, formed in the frames $d$.

If a rubbing contact between the plunger F and main conductor C is desired, it may be provided in the manner shown in Fig. 14, by the addition of a leaf-spring, $m'$, the ends of which project beneath the end of the plunger, so that during the up or down movement thereof they are rubbed against the top surface of the conductor C.

It must not be inferred from the particularity of detail with which I have herein described the construction in which I have embodied my invention that my invention is essentially limited to that construction, since my invention is susceptible of considerable modification in matters of structural detail without departing from its essential features, which will be defined in the claims.

In the constructions that I have thus far described the plungers F F serve each a double function—namely, the mechanical function of supporting the sections of the service-conductor and guiding them in their up and down movement and the electrical function of making and breaking contact in order to bring the sections into or out of circuit. The combining of these two functions in one part is preferable for the sake of simplicity and cheapness, but is not essential, since separate devices might be provided for accomplishing these two functions.

The mechanical function may be performed by any suitable construction whereby the sections of the service-conductor are supported and are guided by unyielding vertical surfaces in such manner as to prevent the lateral displacement of the sections or their displacement in longitudinal direction to such extent as to make electrical contact with one another. The best means of providing such vertical guides is, in my opinion, by constructing a rod or plunger to move in a vertical guiding socket or cavity; but any other construction of guides known to mechanics might be substituted if adapted to the conditions stated. The electrical function of closing and breaking the circuit-connection may be performed by any sort of contact-maker deriving motion from the movement of the section of the service-conductor and making contact either directly with the surface of the line-conductor or indirectly therewith through the medium of any conducting-surface or part in electrical connection with the line-conductor.

The sections of the service-conductor, instead of being mounted on two fulcra between their middles and ends, so that they tilt as levers, might be mounted on supports at their opposite ends only by pivotal or rocking supports, or they might be fixed rigidly to their guiding-supports, so as to have a parallel movement. In either case suitable springs or equivalents should be provided to press up the sections, and stops should be provided to limit positively the upward movement of the sections under the influence of the springs. These stops are most conveniently constructed as a part of the support—as, for example, by means of the collar $m$, formed on the plunger F, as already described.

Fig. 15 shows a construction embodying certain of the modifications herein suggested. The line-conductor C is inclosed in insulation and supported by a shell of metal forming the exterior of its inclosing-casing, as in the construction first described. The sectional service-conductor is mounted on mechanical supports which do not form circuit-closers. These supports consist of plungers F F, each of which supports the adjacent ends of two successive sections, H H, so that each section is supported by two plungers at its opposite ends. These plungers consist each of a plug of insulating material formed with a T-head which is grooved longitudinally, and in its groove are placed the ends of the two sections H H, pivot-pins being passed through them to fasten them to the head and prevent their moving in the groove toward each other. The plunger moves in a socket formed by a tubular shell, G, which is fixed in the casing D, its lower end being out of contact with the conductor C and insulated therefrom by a plug, $k$, between which plug and the plunger F is inserted a coiled spring, S, to press up the plunger. The stop to limit the upward movement of the sections consists of a tube, $m$, screwed to the plunger, having its bottom end formed with an inturned shoulder and abutting against a flange or shoulder formed on the top of the tube G.

The circuit-closer consists of a vertical rod or plunger, F', the upper end of which is fastened to the middle of the section H and the lower end of which enters a recess, $l$, in the insulating-filling E and carries a spring, $m'$, as in Fig. 14, the ends of which when the rod is pressed down make contact with the upper surface of the conductor C. The rod F' works in a case or shell, G', of metal, insulated from the exterior metallic envelope, J, and on the upper part of the rod is fixed a thimble, $p$, embracing the upper end of this tube G', to exclude moisture. When the collector-wheel is resting on one section, and thereby pressing it down, the adjacent ends of the two sections in advance of and behind this one are depressed, and the plungers F' of these sections are consequently moved down a distance equal to half their extreme stroke, whereby the spring $m'$ of each plunger is brought into contact with the conductor C, thereby bringing these sections into circuit. As the wheel rolls onto each new section, it presses down also the farther end thereof, thereby moving the plunger F' of this section fully downward and making the contact of its spring $m'$ with the conductor C more intimate.

It is an important advantage of my invention as applied to conductors laid in open-slot conduits that no leakage can be caused by the entrance of water into the conduit through the slot thereof or otherwise, as occurs during wet weather. In such case the water comes in contact only with the service-conductor and drains down therefrom over the exterior of the casing D, being prevented from entering the latter by the thimbles $p\ p$, with which the plungers are provided, and by the broad straps or hoods $r\ r$, which, through the interposition of their packings $r'$, form water-tight coverings over the joints between the sections of casing. The water thus flows away to the lower part of the conduit, whence it is drained off at intervals to the sewers in the manner well understood with reference to cable-railway conduits.

It will be understood that the words "vertical," "lateral," "upward," "downward," and the like are used in this specification and claims in a relative sense, and that the elements of my invention need not be essentially in all instances arranged the same side up, as is shown, since the conducting structure might in some cases be laid on its side, or even inverted, without departing from my invention.

I claim as my invention the following-defined improvements in electric railways of the class herein described, substantially as hereinbefore specified, namely:

1. The combination, with an open-slot conduit, of an insulated line-conductor laid therein, in the upper part thereof, and a service-conductor arranged in said conduit, subdivided into sections, and said sections supported from said insulated line-conductor.

2. In an electric railway of the described class, a service-conductor divided into short sections mechanically separated from one another, in combination with springs for pressing up the sections and rigid vertical guides for each section adapted to prevent lateral displacement thereof in its up-and-down movement.

3. In an electric railway of the described class, a service-conductor divided into short sections mechanically separated from one another, in combination with elastic supports therefor, consisting each of a vertical plunger attached to one of the sections, a socket in which the plunger may rise and fall, and a spring for pressing the plunger up.

4. In an electric railway of the described class, a service-conductor divided into short sections mechanically separated from one another, in combination with two elastic supports for each section constructed to engage its opposite end portions through the medium of horizontal pivots, whereby the section may be depressed at one end before being depressed at the other.

5. In an electric railway of the described class, a service-conductor divided into short sections mechanically separated from one another, in combination with elastic circuit-closing supports for the sections, consisting each of a plunger attached to the section at its upper portion and arranged with its lower end normally just above a contact-surface in connection with the line-conductor, a vertical socket in which said plunger may move up and down, and a spring for pressing it up.

6. In an electric railway of the described class, the combination, with the line-conductor inclosed in insulation with its upper surface exposed at intervals, of a succession of vertical plungers arranged with their lower ends adjacent to said exposed surfaces, respectively, springs for pressing said plungers up to prevent normal contact of their ends with said surfaces, insulated sockets in which said plungers may move up and down, and the service-conductor divided into sections and mounted on said plungers.

7. In an electric railway of the described class, the combination, with the line-conductor, of an insulating and supporting casing therefor, consisting of an insulating-sheath surrounding the line-conductor and a supporting-bar of strong material to which said sheath is fastened.

8. In an electric railway of the described class, the combination, with the line-conductor, of an insulating and supporting casing therefor, consisting of an exterior shell of rigid material and an insulating sheath or filling within said shell surrounding the line-conductor.

9. In an electric railway of the described class, the combination, with the line-conductor, of an insulating and supporting casing therefor, consisting of an exterior shell made in two parts, the one a metal plate of U shape in cross-section and the other a channel-bar closing the open side of said U-shaped plate and fixed thereto, and an insulating sheath or filling surrounding the line-conductor and inclosed within said shell.

10. In an electric railway of the described class, the combination, with the line-conductor and its insulating-casing made in sections of convenient length, of means for connecting together the ends of adjoining sections, consisting of conducting fish-plates arranged to lap over the adjacent end portions of the line-conductor, and a hood embracing the end portions of the two sections of casing.

11. In an electric railway of the described class, the combination, with the line-conductor and its insulating-casing, of a plug of insulating material inserted in said casing and formed with a socket extending to and exposing the surface of the line-conductor, and a plunger in said socket adapted, when pressed down, to make contact at its lower end with said conductor.

12. In an electric railway of the described class, the combination, with the line-conductor and its insulating-casing, of a plunger-shell fixed to said casing and insulated thereby from the line-conductor, a plunger in said shell, and a spring for pressing up said plunger.

13. In an electric railway of the described class, the combination, with the line-conductor and its insulating-casing, of a circuit-closing plunger movable up and down and arranged, when pressed down, to make circuit-connection with the line-conductor, a plunger-shell fixed to said casing and having a neck through which the plunger projects upwardly, and a thimble fixed on said plunger and having an annular flange extending downward and embracing the top of said neck.

14. In an electric railway of the described class, a current-collector for the motor-car, consisting of a conducting-disk and two insulating-disks on opposite sides thereof and of larger diameter to form flanges projecting beyond the periphery thereof, fastened together to form a wheel, and a bearing in which said wheel is rotatively mounted.

15. In an electric railway of the described class, a current-collector for the motor-car, consisting of the combination, with a collector-wheel having a conducting-journal, of a conducting-bearing for said journal, a bearing-frame carrying said bearing, an insulation interposed between said bearing and said frame, and an electric conductor joined to said bearing.

16. In an electric railway of the described class, the combination, with the motor-car, of a collector-wheel, its bearing-frame, a lever extending longitudinally of the car and to which said frame is swiveled on a vertical axis, and a swiveled connection between said lever and the car-body, arranged also on a vertical axis, whereby the collector-wheel is adapted to travel in an open slot and to adjust itself to changes of direction in said slot.

17. In an electric railway of the described class, the combination, with the motor-car, of a collector-wheel, its bearing-frame, a lever extending longitudinally of the car and to which said wheel is swiveled on a vertical axis, a vertically-swiveled part to which said lever is fulcrumed, whereby the collector-wheel is adapted to travel in an open slot and to adjust itself to changes of direction in said slot, and a spring acting against said lever in such direction as to impart a downward tension to said wheel.

18. In an electric railway, the combination, with an open-slot conduit and a conductor laid therein beneath the slot, of a motor-car and a collector-wheel carried by said car and traveling in said slot, with its periphery riding upon and in conductive contact with said conductor and mounted to turn in a bearing above said slot, whereby the wheel may be lifted out of the slot at will.

In witness whereof I have hereunto signed my name in the presence of two subscribing witnesses.

ROBERT LUNDELL.

Witnesses:
ARTHUR C. FRASER,
GEORGE H. FRASER.